May 20, 1952 — C. HUSSMAN — 2,597,800
VIBRATION ISOLATION UNIT
Filed Sept. 13, 1948
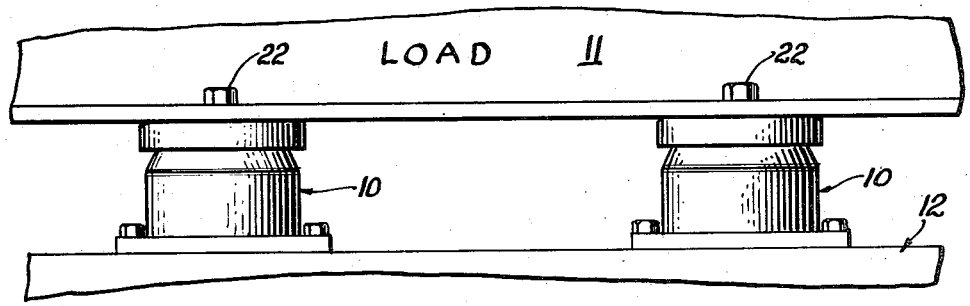
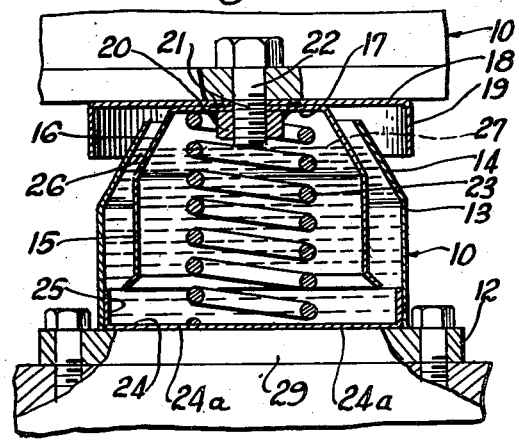
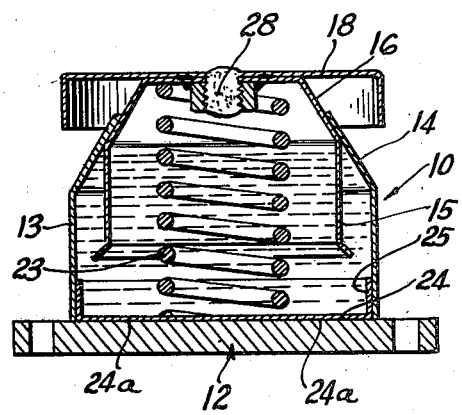
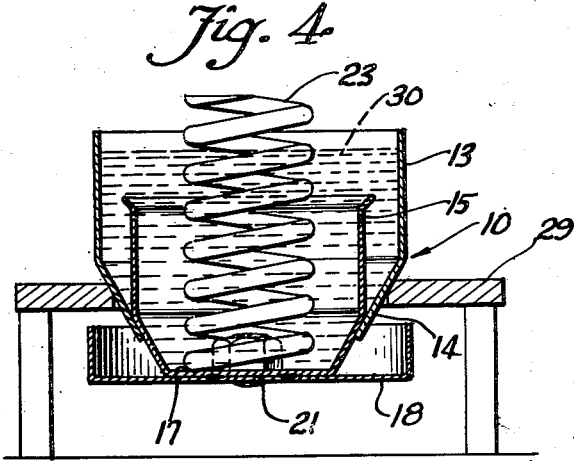
INVENTOR.
Carl Hussman
By Sheridan, Davis & Cargill
Attorneys Patented May 20, 1952

2,597,800

UNITED STATES PATENT OFFICE 2,597,800

VIBRATION ISOLATION UNIT

Carl Hussman, Chicago, Ill.

Application September 13, 1948, Serial No. 49,033

8 Claims. (Cl. 248—20)

This invention relates to improvement in vibration isolation units.

In some types of vibration isolating units employed in the mounting of machines that develop unbalanced moments during operation, such as marine or other internal combustion engines for example, helical springs are employed which carry the imposed load and being placed under compression isolate or insulate the imparted vibrations from transmission to the supporting base and thence to the surrounding stucture. The use of such units is particularly desirable where vibrations transmitted to a supporting base give rise to disturbing noises as on war vessels for example, or where it is desirable to insulate the adjacent structure, including instrument panels or other devices, from mechanical vibrations which by producing fluttering action of the indicators, impair the readability thereof. For the purpose of damping vibrations of the supporting springs employed in the type of units mentioned, and for preventing lateral vibrations or side sway of the springs or other parts of the units, the use of a heavy fluid about the springs has heretofore been employed, as shown for example in my prior Patents Nos. 2,359,915 and 2,359,917, both granted October 10, 1944. The fluid mentioned, while of a viscosity selected for the particular character or conditions of use for which the units are designed, generally is of low flowability when at normal temperatures, that is, the ambient temperatures of a particular installation. However, the damping fluid, while normally of a semi-solid constituency, nevertheless will flow slowly even at normal temperatures and as a consequence considerable annoyance has been caused heretofore in the shipping and storage of the units notwithstanding warnings prominently printed on the cartons or containers, since not infrequently the units have been placed in inverted or non-upright position, permitting the fluid slowly to escape after a period of hours. Where the units are subjected to temperatures above normal while in non-upright positions, the flow of the fluid is greater since the viscosity decreases with rise in temperature and therefore foraminous seals have not always been effective in avoiding escape of the fluid from the units. Hence it frequently has been necessary to return such units to the factory, to have the exteriors cleansed of the heavy, adherent fluid and for re-charging the fluid chambers since otherwise the exteriors were not only unsightly in appearance but the fluid bled through subsequent paint coating and, of course, the deficiency in quantity of the fluid within the chambers impaired or altered the vibration absorbing characteristics of the units.

One object of the present invention therefore is to provide an improved vibration isolating or absorbing unit of a structure that can be sealed against loss of damping fluid during shipment or storage, thereby avoiding the expense, delays and annoyances incident to the escape of the fluid from the units, as adverted to above.

An additional object of the invention is to provide a unit the parts of which, when assembled, are retained normally by the vibration isolating spring in relative sealing relation, thereby avoiding escape of the fluid during shipment or storage.

A further object of the invention is to provide a vibration insulating or isolating unit having container parts that cooperate upon assembly thereof, to provide a sealed container for the enclosed damping fluid and which, when subjected to an imposed load, is open to the atmosphere to permit "breathing" as the unit functions in use.

Other objects of the invention relate to various features of construction and arrangement of parts which will be apparent from a consideration of the following specification and accompanying drawings illustrating a structure that is illustrative of the present improvements, wherein:

Figure 1 is a side elevation of a pair of the improved units shown in operative position supporting a vibration generating load upon a base, there being generally four such units in a given installation and in some instances a greater number;

Fig. 2 is a vertical sectional view of a unit illustrating a relationship of the parts while under load;

Fig. 3 is a vertical sectional view of a unit showing the sealed relation of the parts upon assembly thereof;

Fig. 4 is a view showing the position of certain of the parts in inverted, self-sealing relation preparatory to receiving the hot, damping fluid.

In Fig. 1 of the drawings the vibration or insulating units are indicated generally by the numeral 10, two of the units only being shown but it will be understood that generally four such units are employed for supporting a machine or load wherein the vibrations originate and in some instances a greater number of such units are used. In Fig. 1, the machine or supported load is indicated by the numeral 11 and may be any type of machine, such as an internal combustion engine of the marine or other type, the vibrations originating in which are to be inhibited from transmission to a supporting base 12. In Fig. 2 one of the units is shown in operative relation, that is, with a load imposed thereon.

The illustrated unit 10 shown in Figs. 2 and 3 comprises an outer shell 13 the lower portion of which is cylindrical while the upper portion 14 is of frusto-conical form. Within the shell 13 is positioned a relatively movable cup-like member 15, likewise having a lower cylindrical portion in the particular form illustrated, and an upper frusto-conical portion 16. The angle formed by the portion 16 with reference to the vertical is the same as the angle formed by the portion 14 with respect to the vertical whereby when the cup member 15 is in the elevated position such as is shown in Fig. 3, the two conical sections 14 and 16 will form sealing contact one with the other. Referring to Fig. 2 it will be seen that cup member 15 is provided with an upper end wall 17 to the outer surface of which is attached a cap 18 provided with a depending annular flange 19. Member 18 is attached permanently to the top 17 as by spot welding, the parts being formed, for example, of stamped or spun sheet metal, preferably the former. To the lower or inner surface of the top wall 17 is secured a nut 20 as by welding, the threaded passage of the nut being aligned with an aperture 21 provided in members 17 and 18 and through which is adapted to be passed a bolt 22 for threaded engagement with the nut. The bolt is employed for securing the load 11 to the unit 10 as indicated in Figs. 1 and 2.

Disposed within the inverted cup-like member 15 is a helical spring 23, the spring being confined between the top wall 17 of the member 15 and a bottom closure member 24 which is shown as being provided with a flange 25 which has a tight frictional fit within the lower cylindrical portion of the member 13. The spring is of the stiffness or strength required for isolating vibrations originating in the load 11 as will be understood, and in use is under compression. Compression of the spring by the load causes the conical wall 16 of member 15 to move downwardly and therefore to provide an annular clearance or space 26 between the two conical walls, thus opening the interior of the units to the atmosphere, permitting the apparatus to "breathe" during operation. The downwardly extended flange 19 of the cap plate 18 not only stiffens the plate but it acts as a shield for excluding foreign substances from the unit that might enter through the space 26.

The unit contains a quantity of vibration damping fluid, the normal level of which is approximately along the line indicated by numeral 27. This fluid at normal temperatures is of high viscosity and has a damping effect upon vibrations transmitted to the spring and inhibits transmission of the same from the spring to the base 12. The fluid under normal temperatures is only slightly flowable. For example should some of the fluid while hot and therefore readily flowable be poured into a container and permitted to cool it can not then be poured immediately from the container by merely inverting it. However, if the container is tipped on its side or turned upside down and left in that condition for a substantial period, such as several hours or days, depending on its viscosity, the fluid will slowly flow from the container. It is because of this characteristic of flowability notwithstanding its near approach to a solid state at normal temperatures, that it is desirable to provide sealed units for preventing the escape of the fluid from the units during shipment or storage.

Fig. 3 of the drawing shows the unit in sealed relation, that is, the conical walls 14 and 16 are in contact, the bolt aperture 21 of the member 18 and top wall 17 normally being temporarily sealed either with a threaded plug or merely with glaziers putty 28 the latter of which, when the unit is to be installed may be pressed into the unit without damage.

Referring to Fig. 4, parts of the unit are shown in inverted relation in which position they are placed preparatory to pouring in the hot damping fluid. The shell 13 is shown supported by any suitable fixture 29. The member 15, as shown, is supported by its conical portion 14 which engages the conical portion 16 of the cup 15. The bolt passage 21 is closed by any suitable means, as mentioned above. The spring 23 rests upon the inverted top wall 17. The fluid is poured into the device up to approximately the level indicated by line 30, that is, approximately ¼ inch of the upper edge of the shell 13, which normally is the lower edge. The spring 23 is slightly longer than the distance between the top wall 17 and the bottom edge of the member 13. After the fluid has been poured in place the unit is set aside for the fluid to cool when it becomes very viscous as described above. The bottom closure member 24 which is secured, as by arc welding indicated at 24a to a mounting plate 12 may then be pressed into position, that is, with the flange 25 in tight frictional contact with the inner surface of the lower portion of the member 13 to seal the same. The spring is slightly compressed by the seating of the base member 24 into the shell 13 as will be seen by examination of Fig. 4, and hence the spring tends to retain the cup 15 in the outermost or extended position as shown in Fig. 3. If desired the flange 25 and the contacting portion of the shell 13 may have interlocking formations although generally such are not necessary where the frictional contact between the flange and the shell is adequately tight. Hence it will be seen that the container members, after being supplied with fluid and the fluid has cooled and returned to the semi-solid state, are sealed against leakage of the fluid from the unit whether the latter is in inverted position or is turned on its side during transportation or storage.

Following the installation of a unit or units, as illustrated in Fig. 1, if the fluid of a unit has not settled in the unit to the normal level indicated by line 27, it will soon do so due in part to the vibratory action of the spring as the machine is operated and to the slight heat generated thereby which renders the fluid less viscous. The fluid functions as stated above to damp out vibrations which might be transmitted by the spring to the base member 24 and thence to the support 12. Since the fluid usually encloses all but the upper one or two convolutions of the spring and lies also between the shell 23 and the cup 15, it inhibits side sway and lateral vibrations, thereby stabilizing the unit.

Should the load be removed from the units, the respective springs 23 immediately cause the cups 15 to rise into sealing contact with the upper conical portions 14 of the respective shells and thus seal the units until a load of the calculated value has been reimposed thereon. When a proper load has been imposed on a unit of average size, the spring of the unit is compressed about ⅜ of an inch which generally is adequate to afford free play of the spring in isolating vibrations. This distance may be greater of course in units of larger load capacity.

While the improved unit, in the form illustrated, employs a spring for isolating vibrations or inhibiting transmission thereof from the load to the base, it utilizes a damping fluid also preferably, for augmenting the functioning of the spring for improved results, particularly with respect to stabilizing the unit for resisting side sways. The container for the spring and fluid, comprising the container members 13 and 15 are self sealing upon completion of assembly of the unit or whenever the unit is not in use but when a calculated load has been imposed on the unit the container is automatically opened to the atmosphere as has been described.

While I have shown and described a structure that is illustrative of the invention it will be seen that various changes in the details illustrated may be resorted to within the spirit of the invention as defined by the following claims.

I claim:

1. A vibration isolating unit for use in mounting a vibration generating load upon a subjacent base comprising a container for a damping fluid, said container comprising an outer container member adapted to be attached to a base and an inner container member adapted to be attached to a superjacent load, said container members being arranged in partially telescoped relation and annularly spaced apart, and a compression spring disposed within the container between said container members and tending to move said members apart in an axial direction and adapted to be compressed partially by an imposed load for inhibiting transmission of vibrations from the load to the base when the unit is in use, said container members having frusto-conical wall portions movable relatively into sealing relation by said spring when the unit is unloaded for limiting separating axial movement of the container members by the spring and preventing flow of damping fluid from the container between said frusto-conical wall portions.

2. A vibration isolating unit comprising a pair of container members provided with telescopic portions and with formations spaced apart under load and which inter-engage in sealing contact when the members are in the maximum extended relation, a vibration absorbing and load supporting spring disposed between said members tending to move the same into said sealing contact and being compressible by an imposed load to permit said members to move relatively to unsealing relation, and vibration damping fluid in the container members surrounding the spring and disposed between the telescoped portions of the container members for damping lateral vibrations imposed on the unit by the load.

3. A vibration isolating unit comprising a pair of partially telescoped container members provided with frusto-conical portions spaced apart under load and which are adapted to contact in sealing relation when the members are in maximum extended relation, a compression spring within said members tending to retain the same in said sealing relation and adapted to be compressed partially by an imposed load whereby said container members are moved out of sealing relation, and vibration damping fluid in the container members surrounding the spring and disposed between the telescoped portions of the container members for damping lateral vibrations imposed upon the unit by the load.

4. A vibration isolating unit for use in mounting a vibration generating load upon a subjacent base comprising a container for damping fluid, said container comprising a lower container member open at the upper end and an upper container member open at the lower end, said upper container member being disposed in partially telescoped relation within the lower container member, and a compression spring in the container confined between said container members and adapted to be further compressed by an imposed load when in use for inhibiting transmission of vibrations from the load to the base, said container members being provided with cooperating frusto-conical wall portions spaced apart under load and which are adapted to be retained by said spring in sealing relation when the unit is not in use for preventing flow of damping fluid from the container between said wall portions upon placement of the unit in non-upright position and being movable apart to open the container to the atmosphere when the unit is in use.

5. A vibration isolating unit for use in mounting a vibration generating load upon a subjacent base comprising a compression spring adapted to be placed under partial compression by the imposed load for inhibiting the transmission of vibrations from the load to the base, and an enclosure for the spring for retaining a damping fluid thereabout and comprising an upper and a lower container member arranged in partially telescoped relation and provided with cooperating frusto-conical wall portions spaced apart under load and adapted to be moved by the spring into sealing contact when the unit is not in use to prevent outward flow of fluid between said wall portions and being movable apart to open the container to the atmosphere when the spring is in load supporting relation.

6. A vibration isolating unit for use in mounting a vibration generating load upon a subjacent base comprising a compression spring adapted to be placed under compression by the imposed load for inhibiting transmission of vibrations to the base, and an enclosure for the spring for retaining a damping fluid thereabout, said enclosure comprising an upper container member and a lower container member, said upper container member being provided with an inner frusto-conical wall and the lower container member being provided with an outer frusto-conical wall, said frusto-conical wall portions being spaced apart during use of the unit under load, said container members being movable in an axial direction by the spring when unloaded for causing said wall portions to contact to provide a seal preventing escape of contained fluid between said walls and movable in the opposite axial direction by a load on the unit to separate said walls for opening the interior of the container to the atmosphere.

7. A vibration isolating unit for use in mounting a vibration generating load upon a base comprising a spring adapted to be placed under compression by a load for inhibiting transmission of vibrations from the load to the base, and a container for the spring for retaining thereabout a damping fluid, said container comprising a lower container member adapted to be attached to the base and an upper container member adapted to be attached to the load and confining said spring therebetween, said lower container member being open at the upper end, said upper container member being open at the lower end and extending into the open end of the lower member and movable telescopically therein and within the fluid in the lower member as the spring compresses and distends under influence of vibrations imposed thereon by the load, said container members being provided, under load, with normaly spaced apart frusto-conical wall portions adapted to be moved into sealing contact by the spring when the unit is unloaded for automatically sealing the container against loss of fluid when not in use.

8. A vibration isolating unit comprising a spring adapted to be disposed between a base and a superjacent vibration originating load for inhibiting transmission of vibrations from the load to the base, and a container for the spring for retaining thereabout a body of vibration damping fluid, said container comprising a pair of upper and lower container members confining the spring therebetween, said upper container member extending into the lower member and movable with the spring as it compresses and distends under influence of vibrations of the imposed load, said container members being provided, under load, with normally spaced apart mutually engageable formations movable into contact by the spring when the unit is not in use to provide a seal between the container members preventing escape of contained fluid therebetween.

CARL HUSSMAN.

REFERENCES CITED

The following references are of record in the file of this patent:

UNITED STATES PATENTS

| Number | Name | Date |
|---|---|---|
| 1,734,596 | Rosenzweig | Nov. 29, 1929 |
| 1,949,208 | King | Feb. 27, 1934 |
| 1,951,020 | Hoevel | Mar. 13, 1934 |
| 2,357,120 | Kuebert et al. | Aug. 29, 1944 |
| 2,359,917 | Hussman | Oct. 10, 1944 |